Figure 1:
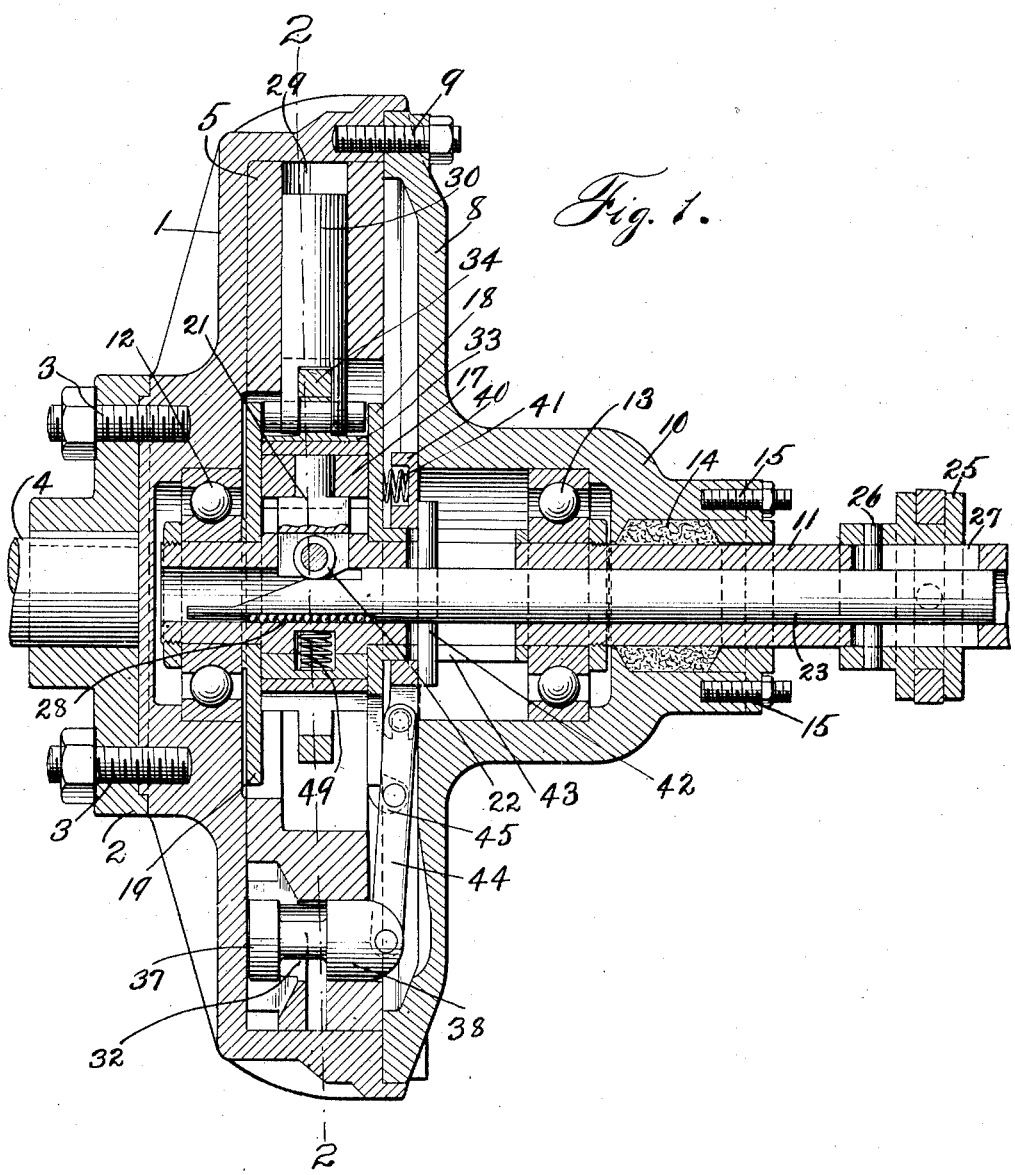

A. SUNDH.
FLUID CLUTCH.
APPLICATION FILED APR. 4, 1917.

1,372,985.

Patented Mar. 29, 1921.
4 SHEETS—SHEET 1.

August Sundh
Inventor

By his Attorney
James G. Bethell.

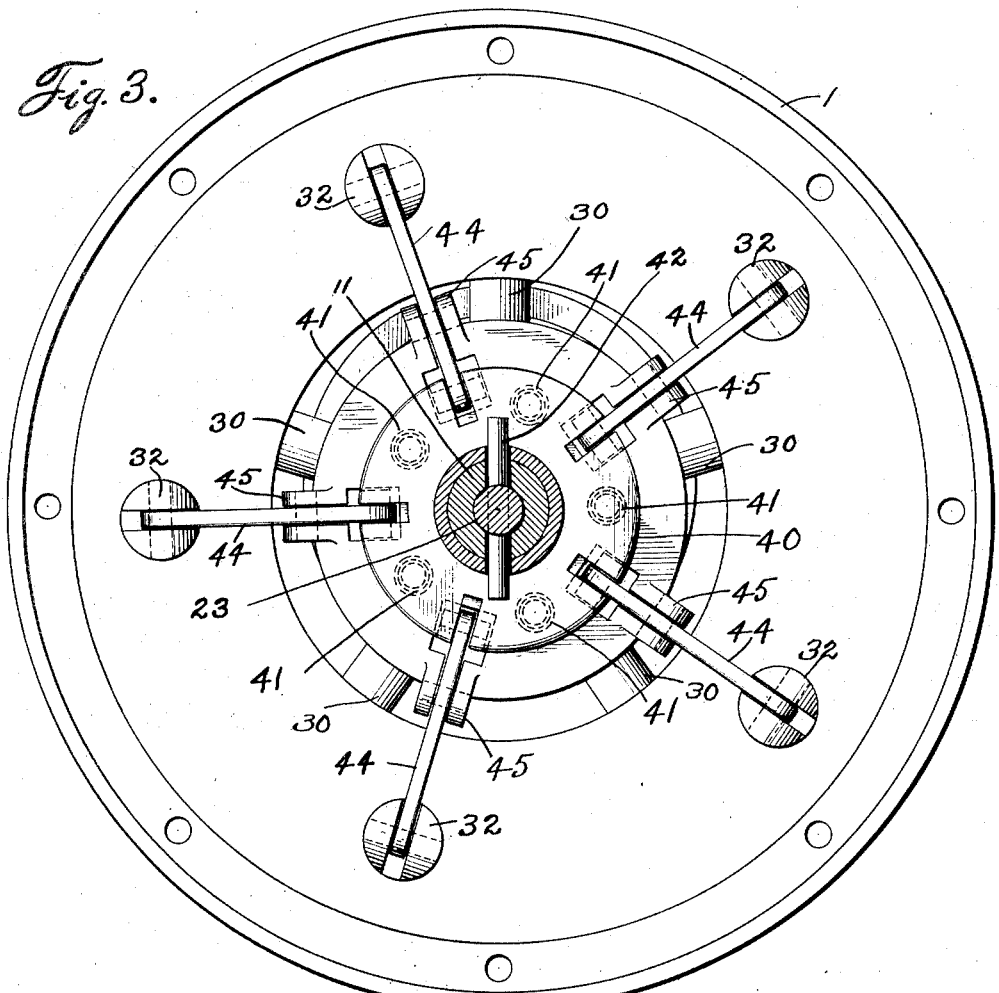
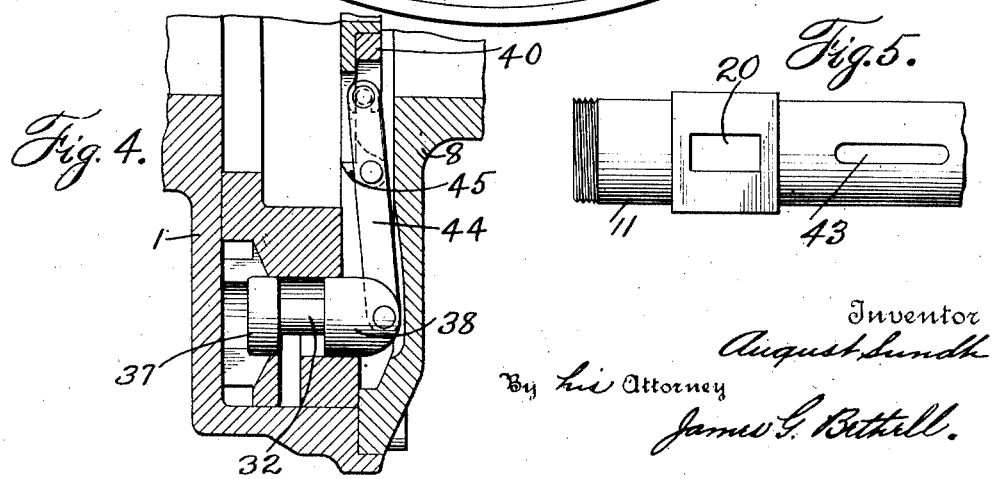
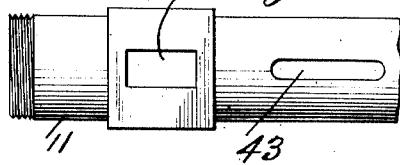

A. SUNDH.
FLUID CLUTCH.
APPLICATION FILED APR. 4, 1917.
1,372,985.
Patented Mar. 29, 1921.
4 SHEETS—SHEET 4.
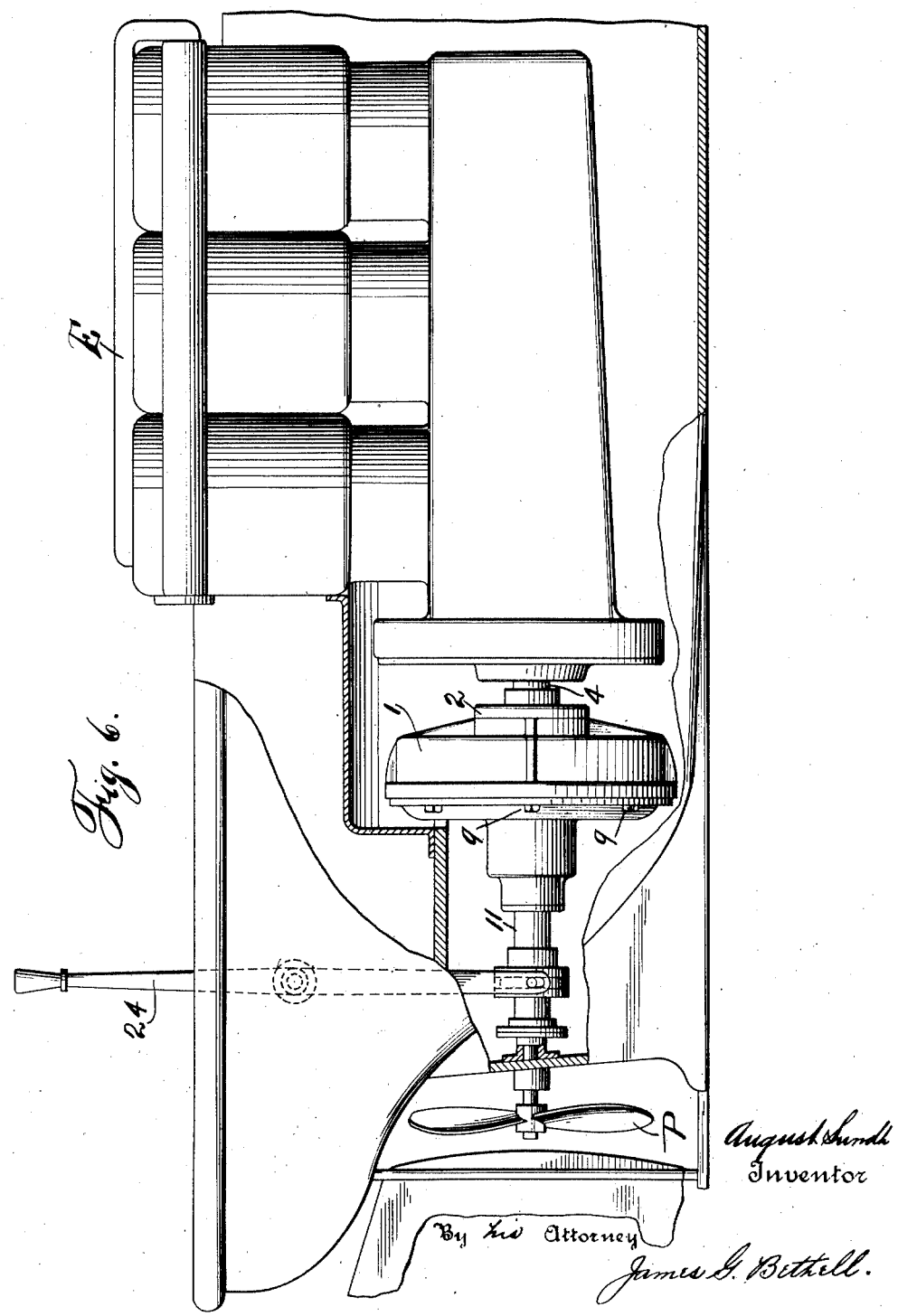
August Sundh
Inventor
By his Attorney
James G. Bethell.

UNITED STATES PATENT OFFICE.

AUGUST SUNDH, OF HASTINGS-UPON-HUDSON, NEW YORK.

FLUID-CLUTCH.

1,372,985.  Specification of Letters Patent.  Patented Mar. 29, 1921.

Application filed April 4, 1917. Serial No. 159,674.

*To all whom it may concern:*

Be it known that I, AUGUST SUNDH, a citizen of the United States, residing in Hastings-upon-Hudson, in the county of Westchester and State of New York, have invented a new and useful Improvement in Fluid-Clutches, of which the following is a specification.

My invention relates to an improvement in fluid clutches, and one of the objects of my invention is to provide fluid clutch mechanism whereby the clutch members may be coupled together to run at the same speed, with practically no slippage.

An object of my invention also, is to provide a clutch, whereby one clutch member may be run at variable speed relative to the other member, by operation of mechanism for actuating a fluid within the members.

A still further object of my invention is to provide a clutch whereby one member may be running at full speed, with the other member disconnected therefrom, this member, together with the fluid and the fluid actuating mechanism remaining at rest.

I am able therefore to obtain a positive disconnection of the two clutch members, allowing one member to run while the other is standing still, at which time the fluid actuating mechanism is not operating, and therefore the fluid is not being actuated. I am able also to vary the relative speeds of the two clutch members as desired, the fluid at this time being actuated proportionately to the relative speeds of the two clutch members; and I may have both clutch members running at the same speed, with the fluid under pressure, but not being actuated. With my clutch I obtain minimum wear on its various parts. I obtain maximum efficiency, and heating of the fluid and leakage are reduced to a minimum. I may, therefore, run my clutch at any speed and for any length of time desired, with very little wear on the mechanism and very little heating of the fluid.

The embodiment of my invention illustrated, comprises a hollow casing adapted to be driven by any suitable source of power. Within this casing, I provide a fluid, preferably oil, which is adapted to be actuated by pistons also carried in the casing. The other member of the clutch comprises a shaft which is attached to the load to be driven, this shaft carrying eccentric mechanism, adjustable to concentric or eccentric position relative to the shaft, and adapted to operate the pistons already mentioned, to cause them to actuate the fluid, the actuation of the fluid being controlled by means independent of the eccentric mechanism.

When it is desired to have the clutch member comprising the casing, etc., rotating, and the other member standing still, I merely move the eccentric mechanism to a position where it is concentric with the shaft on which it is mounted, at which time the fluid actuating mechanism will not operate to actuate the fluid, and there will be a positive disconnection of the two clutch members, centrifugal force aiding in this, by drawing the pistons away from the eccentric mechanism.

To have both clutch members run at the same speed, the eccentric mechanism is adjusted to full eccentric position, and the mechanism controlling the actuation of the fluid by the pistons is moved into position to cause the fluid within the casing to be locked therein under pressure, which pressure depends upon the load to be driven, to cause both clutch members to rotate as a unit.

To enable the clutch members to be driven at variable speed relative to each other, the eccentric mechanism is left in full eccentric position, and the mechanism controlling the actuation of the fluid is adjusted to allow some of the fluid to be by-passed, the amount by-passed depending upon the variation it is desired to obtain in the relative speeds of the two clutch members.

The mechanism controlling the actuation of the fluid by the pistons, comprises a series of balanced valves operatively connected to each other, and adapted to be controlled by a single means, to regulate the amount of fluid actuated by the pistons, or to prevent any fluid from being actuated by the pistons at all, this control of the fluid, enabling me to run the clutch members at any speed relative to each other that I may desire.

At the time the two clutch members are running at variable speeds relative to each other, fluid is actuated by the pistons, to a degree depending upon such relative speeds, and this is the only time at which the fluid is actuated, remaining at rest at all other times, so far as actuation is concerned.

Other novel features of my invention and the advantages thereof will be more fully pointed out in the detailed description following.

Figure 2:
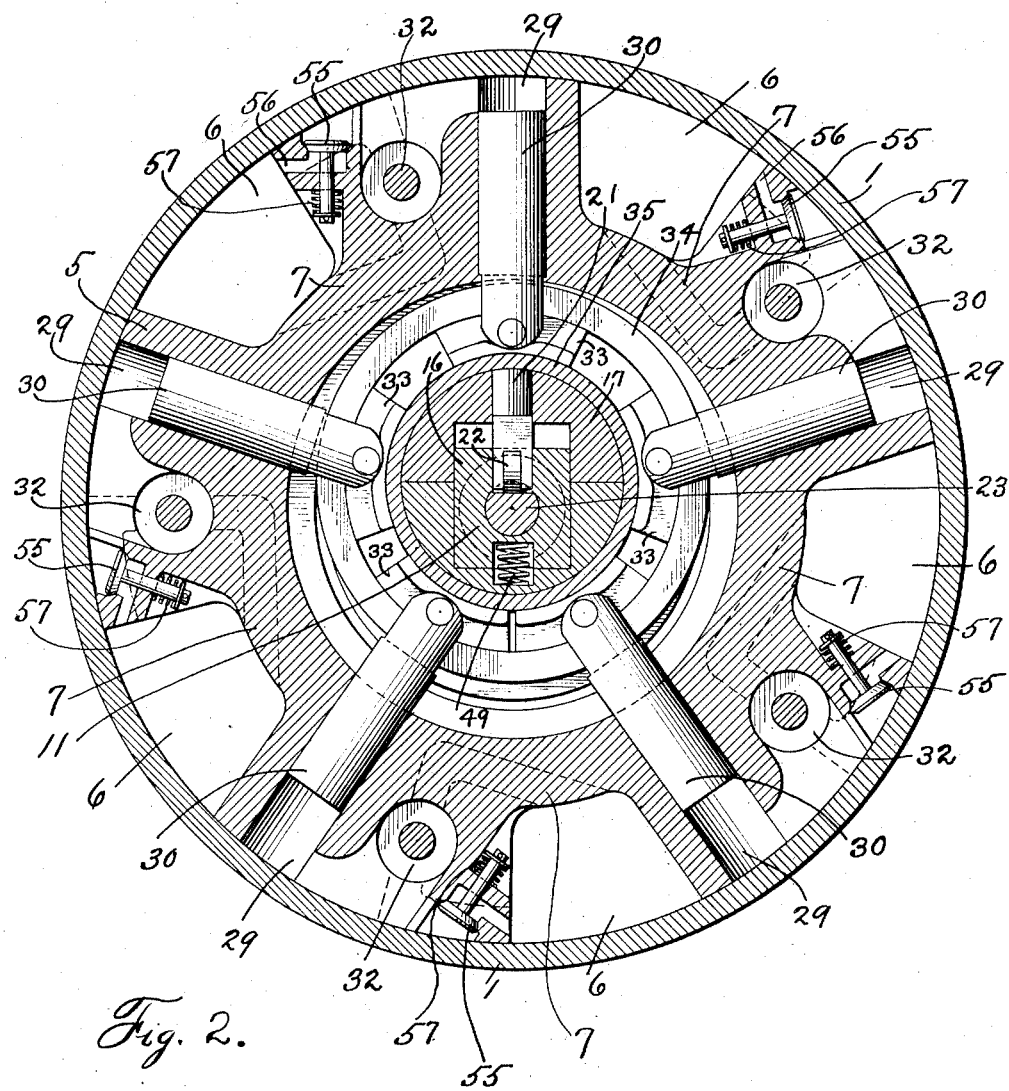

In the accompanying drawings, Figure 1 is a sectional elevation view of the clutch; Fig. 2 is a sectional elevation taken at right angles to Fig. 1; Fig. 3 is an end elevation partly in section of the casing with one side removed, showing the by-pass valves and the mechanism for controlling them; Fig. 4 is a fragmentary section of the casing showing one of the by-pass valves in full lines, together with part of the operating mechanism therefor; Fig. 5 is a plan view of the shaft which carries the eccentric mechanism; and Fig. 6 is a general arrangement showing my clutch mounted between an internal combustion engine and a propeller.

Like characters of reference designate like parts in all the figures.

Referring to the drawings in detail, 1 designates a hollow casing, having a plate 2 secured thereto by means of studs 3, 3, this plate being keyed to the drive shaft 4, of an internal combustion engine E. Within the casing 1, is a casting 5, having a series of chambers 6. This casting is held in place in the casing, by a plate 8, bolted to the casing, by studs 9, the plate 8 having a lateral extending portion 10, which is adapted to receive a hollow shaft 11, which enters the casing 1, and has bearings therein at 12 and 13. This shaft is shown connected to a propeller P. A stuffing box 14 is provided for the shaft 11, this stuffing box being secured to the lateral extension 10 of the plate 8, by means of studs 15. A squared portion 16 is provided on the shaft 11 for the reception of a two-part member 17, which is adapted to slide laterally relative to the shaft 11, being guided in this movement by members 18 and 19 carried on the shaft. A rectangular orifice 20 is cut through the wall of the shaft 11 and into this orifice extends a member 21 correspondingly shaped, the upper end of this member as viewed in Figs. 1 and 2, being provided with a contracted portion having a driving fit in an orifice provided in the upper part of the member 17. Near the lower end of the member 21, I have provided an anti-friction roller 22. Carried within the shaft 11, is a rod 23, adapted to be moved longitudinally thereof by means of a lever 24, engaging a collar 25, mounted on the shaft 11, this collar being rotatable with the shaft 11 by means of a pin 26, extending through both the shaft 11 and the rod 23. The rod 23 is limited in its movement by the pin 26, which rides in a slot 27 in the walls of the shaft 11, the ends of this slot limiting the movement of the pin 26, and therefore the rod 23. The left hand end of the rod 23 (see Fig. 1) rests on ball bearings 28, provided in the inside of the shaft 11.

Formed within the casting 5 are cylinders 29, within which pistons 30 are adapted to be reciprocated, the cylinders being in communication with the chambers 6 by way of passages 7, the flow of fluid through these passages being controlled by balanced by-pass valves 32, these valves being supported within the casting 5 at right angles to the cylinders 29, as viewed in Fig. 1. Attached to the ends of the pistons 30 by means of pins, are shoes 33, the ends of the pistons engaging the shoes, to take up some of the effort exerted by the pistons, so that this will not have to be all borne by the pins by which the pistons are attached to the shoes. A collar 34 surrounds the shoes, the pistons 30 being slotted to straddle this collar, as plainly shown in Fig. 1. The shoes are adapted to engage a collar 35 shrunk on to the two part member 17 carried by the shaft 11.

The by-pass valves 32, already mentioned, are mounted to be moved to shut off the flow of fluid through the passages 7 to and from the chambers 6, and their construction and the controlling means therefor will now be described. Each valve has two heads or pistons 37 and 38, and the fluid in passing through the passages 7 flows around a contracted portion in each valve between the heads 37 and 38. As the faces of the pistons 37 and 38 are the same, it will be seen that the valves will always be in balance. The valves are connected to each other by means of a plate 40 mounted on a lateral extension of the member 18 (see Fig. 1), springs 41 being provided between the plate and the face of this member. To regulate the valves 32 and thereby control the flow of fluid through the passages 7, I have provided a pin 42 secured in the rod 23, said pin passing through a slot 43 cut through the walls of the shaft 11. Attached to the end of each valve is a lever 44, pivoted to projections 45 formed on the face of the member 18. The other ends of these levers 44 are pivotally attached to the plate 40. Movement of the plate 40 toward and away from the face of the member 18, which is accomplished by movement of the rod 23, will cause the valves 32 to be moved to regulate the flow of fluid through the passages 7 as desired.

Valves 55 are provided in the casting 5 and control ports 56. The valves are normally seated by springs 57. The purpose of these valves is to admit fluid to the cylinders 29 by way of the ports 56 from the chambers 6, so that the pistons 30 will never work on a vacuum.

The operation of my improved clutch is as follows: If it be desired to have the casing 1 and the shaft 11 together with its load to rotate as a unit, the rod 23 is moved to its extreme left hand position, to move the eccentric mechanism comprising the members 13

21, 17 and 35 to extreme eccentric position; and at this time the pin 42 carried by the rod 23 will have forced the plate 40 to the left toward the member 18, compressing the springs 41, and rotating the levers 44 about their pivots to actuate the by-pass valves 32 into position to close the passages 7. The fluid within the casing is now locked under pressure, the pressure depending of course upon the load on the shaft 11, and the clutch mechanism will then be rotated as a unit by the internal combustion engine E, the shaft 11 running at the same speed as the casing 1, the two being locked together by the fluid under pressure within the casing. Now if it be desired to have the shaft 11 run at a different speed relatively to the casing 1, the rod 23 is moved slightly to the right, the anti-friction roller 22 on the member 21 bearing on the straight surface on the rod 23, and the rod itself riding on the ball bearings 28. This movement of the rod 23 will cause the valves 32 to be moved under the action of the springs 41 to permit the flow of fluid through the passages 7 to and from the chambers 6, the amount of flow of the fluid of course depending upon the amount of movement of the rod 23. At this time it will be noticed that the eccentric mechanism has not been disturbed, that is to say it is in full eccentric position. With some fluid being by-passed by the valves 32, the shaft 11 will be driven at a slower speed than the casing 1, although the eccentric mechanism is still in its full stroke position, and any further variation in the relative speeds of the two clutch members 1 and 11, may be obtained by merely adjusting the rod 23 either to the right or left, depending upon whether it is desired to have the shaft 11 rotate still slower, or faster. By the provision of the ball bearings 28 and the anti-friction roller 22, it is apparent that no great effort is required to adjust the rod 23, and therefore the eccentric mechanism and the by-pass valves to any desired position.

Now if it is desired to have the casing 1 rotate, with the shaft 11 and its load standing still, the rod 23 is moved to its extreme right hand position, allowing the roller 22 carried by the eccentric member 21 to ride off the straight surface on which it rests in Fig. 1, and the inclined face of the lower end of the said eccentric member rides down the inclined surface formed on the rod 23, and on to the straight surface formed at the extreme left hand end of the said rod, being brought to this position as the rod 23 is withdrawn from beneath it, by means of a spring 49, one end of which seats in an orifice provided in the shaft 11, its other end seating in an orifice provided in the member 17 (see Fig. 2). With the parts in this position, the eccentric mechanism will be concentric with the shaft 11, and the pistons 30 will not be reciprocated to actuate the fluid in the casing; also at this time the centrifugal force due to the rotation of the casing 1 will cause the shoes 33 to be drawn away from the collar 35 forming part of the eccentric mechanism, the shoes and the collar 34 being properly dimensioned to permit this slight relative movement. At this time, therefore, the shaft 11 and its connected mechanism is disconnected from the casing 1, the friction in the bearings 13 and 12, and in the stuffing box 14, being the only engagement of the two, which of course would be negligible.

From the foregoing, it will be seen that I have provided a clutch whereby the two members comprising it can be driven at the same speed or at different speeds to drive the load correspondingly, or one member may be driven while the member carrying the load remains at rest. It will be observed also that fluid is only actuated when the two clutch members are being driven at different relative speeds, and that the construction and operation of the clutch insures that the various parts will not be subjected to a great deal of wear and that leakage and heating of the fluid are reduced to a minimum.

It is to be understood that my clutch is not to be limited in its application to the use to which I have shown it in the drawings forming a part of this application.

Inasmuch as others skilled in the art might make various changes in the construction and arrangement of parts herein shown and described without departing from the spirit and scope of my invention, I desire not to be limited to the exact details of construction, etc., herein illustrated.

What I claim is new, and desire to secure by letters patent of the United States is:—

1. In fluid clutch mechanism, the combination of driving and driven clutch members, fluid actuating mechanism and ajustable means for actuating the same carried by different clutch members, and means for controlling the actuation of the fluid without changing the position of the adjustable means, to cause the clutch members to be driven at any desired relative speed.

2. In fluid clutch mechanism, the combination of driving and driven clutch members, fluid actuating mechanism and means for operating the same, means independent of the fluid operating mechanism for controlling the actuation of the fluid, and a single means for directly controlling the means operating the fluid actuating mechanism and the means for controlling the actuation of the fluid.

3. In fluid clutch mechanism, the combination of driving and driven clutch members, fluid actuating mechanism and means for operating the same carried by different clutch members, means independent of the fluid actuating mechanism for controlling the actuation of the fluid, and a single means for directly controlling the means operating the fluid actuating mechanism and the means for controlling the actuation of the fluid.

4. In fluid clutch mechanism, the combination of driving and driven clutch members, fluid actuating mechanism and means for actuating the same carried by different clutch members, mechanism for adjusting the means for actuating the fluid actuating mechanism, valve mechanism controlling the actuation of the fluid to cause the clutch members to be driven at any desired relative speed, the valve mechanism being controlled by said adjusting mechanism.

5. In fluid clutch mechanism, the combination of driving and driven clutch members, fluid actuating mechanism and adjustable eccentric mechanism for actuating the same, balanced valve mechanism for controlling the actuation of the fluid to obtain any desired relative speed of the clutch members, and a single controlling device for the eccentric and valve mechanism.

6. In fluid clutch mechanism, the combination of driving and driven clutch members, fluid actuating mechanism and adjustable eccentric mechanism for actuating the same carried by different clutch members, balanced valve mechanism for controlling the actuation of the fluid to obtain any desired relative speed of the clutch members, and a single controlling device for the eccentric and valve mechanism.

7. In fluid clutch mechanism, the combination of driving and driven clutch members, fluid actuating means and an eccentric mechanism for actuating the fluid actuating means carried by different clutch members, means for shifting the eccentric, valve mechanism for controlling the actuation of the fluid, and levers for adjusting the valves, said levers being operable by the eccentric shifting mechanism without changing the position of the eccentric.

8. In fluid clutch mechanism, the combination of driving and driven clutch members, means for actuating a fluid and eccentric mechanism for actuating the fluid actuating means carried by the clutch members, means for shifting the eccentric, valve mechanism for controlling the actuation of the fluid, levers for adjusting the valves, said levers being operable by the eccentric shifting mechanism without changing the position of the eccentric.

9. In fluid clutch mechanism comprising driving and driven clutch members, the combination of fluid actuating mechanism, an eccentric for actuating the same and means engaging said eccentric to which means the fluid actuating mechanism is attached, the fluid actuating mechanism directly engaging the means engaging the eccentric.

10. In fluid clutch mechanism, the combination of driving and driven clutch members, fluid actuating means and eccentric mechanism for actuating the same carried by the clutch members, valves for controlling the actuation of the fluid, controlling mechanism therefor, and anti-friction means carried by said eccentric mechanism and engaging the controlling mechanism for the valves.

11. In fluid clutch mechanism, the combination of driving and driven clutch members, fluid actuating means and adjustable eccentric mechanism for actuating the same carried by the clutch members, guiding means for the eccentric mechanism, valves for controlling the actuation of the fluid, and actuating mechanism for the valves carried by said guiding means.

12. In fluid clutch mechanism, the combination of driving and driven clutch members, fluid actuating mechanism and means for actuating the same carried by the clutch members, balanced valves for controlling the actuation of the fluid, springs for operating the valves in one direction and a center shifting device for operating them in the opposite direction.

13. In fluid clutch mechanism comprising driving and driven clutch members, the combination of fluid actuating mechanism and means for actuating the same carried by the clutch members, balanced valves for controlling the actuation of the fluid, means for automatically operating the valves in one direction and a device for operating them in the opposite direction and to control the said means for actuating the fluid actuating mechanism, said device being operable to actuate said valves without operating the means for actuating the fluid actuating mechanism.

14. In fluid clutch mechanism, the combination of driving and driven clutch members, fluid actuating mechanism and eccentric mechanism for actuating the same carried by the clutch members, balanced valves for controlling the actuation of the fluid, springs for operating the valves in one direction, manually operable means for shifting the eccentric and operable to shift the valves without shifting the eccentric.

15. In a fluid clutch mechanism the combination of driving and driven clutch members, fluid actuating mechanism, adjustable mechanism for actuating the same, whereby when the driven member is idle the fluid is idle, a restrictible passage-way for said fluid coöperating with said fluid actuating mechanism and means for controlling said adjustable mechanism.

16. In a fluid clutch mechanism the combination of driving and driven clutch members, fluid actuating mechanism, adjustable mechanism for actuating the same whereby when the driven member is idle the fluid is idle, a restrictible passage-way for said fluid coöperating with said fluid actuating mechanism and means for controlling said adjustable mechanism and said restrictible passage-way.

17. In a fluid clutch mechanism, the combination of driving and driven clutch members, fluid actuating mechanism and adjustable mechanism for actuating the same carried by different clutch members, and means for controlling the actuation of the fluid to cause the clutch members to be driven at any desired relative speed.

In testimony whereof I have signed my name to this specification.

AUGUST SUNDH.